United States Patent
Ahmed et al.

(10) Patent No.: US 9,043,309 B2
(45) Date of Patent: May 26, 2015

(54) SQL TRANSFORMATION-BASED OPTIMIZATION TECHNIQUES FOR ENFORCEMENT OF DATA ACCESS CONTROL

(75) Inventors: Tanvir Ahmed, Hayward, CA (US);
Thomas Keefe, Mill Valley, CA (US);
Chao Liang, San Ramon, CA (US);
Vikram Pesati, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 254 days.

(21) Appl. No.: 13/488,739

(22) Filed: Jun. 5, 2012

(65) Prior Publication Data

US 2013/0325841 A1    Dec. 5, 2013

(51) Int. Cl.
*G06F 17/30*    (2006.01)
*G06F 21/62*    (2013.01)

(52) U.S. Cl.
CPC ...... *G06F 17/30448* (2013.01); *G06F 21/6218* (2013.01); *G06F 21/6227* (2013.01); *G06F 2221/2141* (2013.01)

(58) Field of Classification Search
CPC .............................................. G06F 17/30448
See application file for complete search history.

(56) References Cited

U.S. PATENT DOCUMENTS

| 2003/0187848 A1 | 10/2003 | Ghukasyan et al. |
| 2005/0246338 A1 | 11/2005 | Bird |
| 2013/0117313 A1* | 5/2013 | Miao et al. ............. 707/781 |

FOREIGN PATENT DOCUMENTS

EP    1564620 A1    1/2005

* cited by examiner

*Primary Examiner* — Belix M Ortiz Ditren
(74) *Attorney, Agent, or Firm* — Hickman Palermo Becker Bingham LLP

(57) ABSTRACT

Techniques are provided for a database server to identify a query that comprises an access check operator specifying a data access control policy, and if so, to re-write the query to produce an optimized query execution plan. A first technique rewrites a query comprising an access check operator based on the privileges associated with the database principal requesting the query. The rewritten query exposes the access predicates relevant to the requesting principal to subsequent database optimization processes. A second technique rewrites a query comprising an access check operator that specifies a data security policy that does not include a denied privilege. A third technique rewrites a query that comprises an access check operator specifying one or more database table columns that store row-specific access control lists. The rewritten queries are used to generate a query execution plan that provides for several query execution optimizations.

20 Claims, 2 Drawing Sheets

SQL TRANSFORMATION-BASED OPTIMIZATION TECHNIQUES FOR ENFORCEMENT OF DATA ACCESS CONTROL

FIELD OF THE INVENTION

The present invention relates to database systems, and in particular, to optimization of queries executed by a database management system associated with a data access control policy.

BACKGROUND

Relational and object-relational database management systems store information in tables of rows in a database. To retrieve data, queries that request data are submitted to a database server, which computes the queries and returns the data requested.

The queries received by a database server may be submitted by application-level end users. In many situations, it may be desirable to prevent particular application-level end users from accessing or modifying some or all of the data stored in a database for security or other reasons. In order to provide such security, access to data stored in a database may be controlled by a database access control service. A database access control service protects database data from undesired access based on one or more defined data access control policies. Each data access control policy defines database access operations, or privileges, that are either granted or denied to particular principals in the database system. Each database principal may be a particular database user or defined group of users. In order to provide fine-grain access control, database access control services may apply data access control policies on a row-level basis, controlling each principal's access to individual rows of database tables.

Database access control services that enforce row-level data access control policies may introduce considerable overhead into a database system. For example, the access conditions defined by data access control policies are specified by the database server in query operators that perform the access checks, increasing the complexity of the queries and query execution. Additional database performance overhead exists to store and evaluate the tables that store the information representing the access control policies and database principals.

Furthermore, in order to enforce data access controls on a row-level data basis, a database access control service has the overhead of evaluating the data access control policies for each row specified in a received query. To further complicate matters, much of the information related to the access control policies in the query is encapsulated in the query operator performing the access check and is unavailable to the query optimization processes during query compilation. The result is that evaluation of data access control policies for every row specified in the query often involves additional and unnecessary access control checks.

Described herein are techniques for optimizing queries against database tables that are associated with a data access control policy.

BRIEF DESCRIPTION OF THE DRAWINGS

The present invention is illustrated by way of example, and not by way of limitation, in the figures of the accompany drawings and in which like reference numerals refer to similar elements and in which.

DETAILED DESCRIPTION

Figure 1:
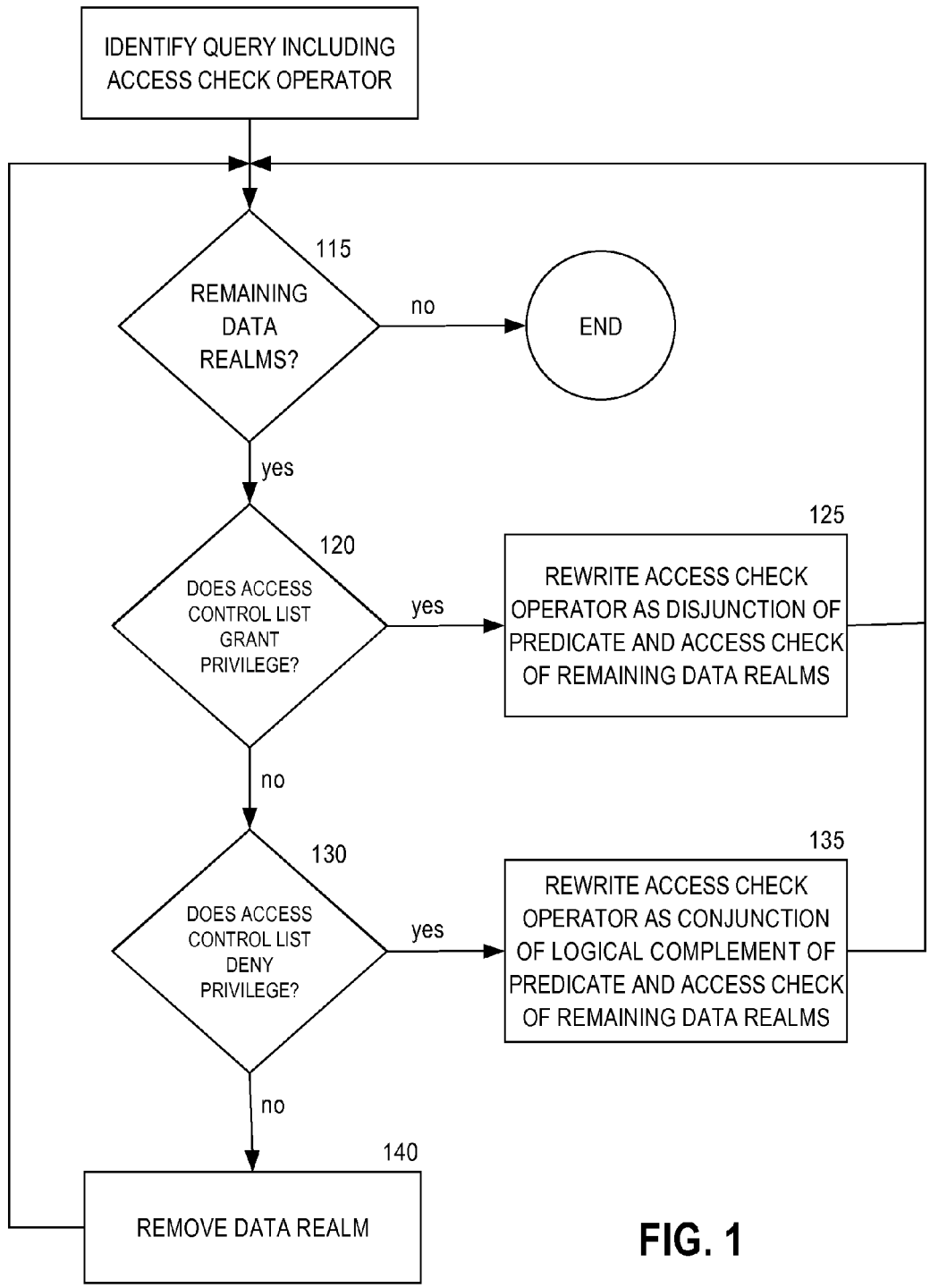
FIG. 1 is a flow diagram illustrating a process of rewriting a query that includes a access check operator based on the principal submitting the query.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The approaches described herein provide ways for a database server to optimize queries against database tables that are associated with a data access control policy. A database server receives a query and determines whether the query identifies one or more tables that are associated with a data access control policy. In response to determining that the query identifies a table associated with an access control policy, the database server rewrites the query to comprise an access check query operator. The access check operator determines, for each row requested in the table, whether the principal submitting the query is granted the privilege to perform the requested query operation. The access check determination is based on the principal and the data access control policies associated with the database table.

A database server may use these techniques to identify a query that comprises an access check operator, and if so, to re-write the query to produce an optimized query execution plan. According to one embodiment, in response to identifying a query that comprises an access check operator, the database server determines, based on the principal submitting the query and the associated data access control policies, one or more access predicates associated with the principal. An access control policy comprises one or more access control lists that each includes one or more access control entries. Each access control entry either grants or denies a privilege to a specified principal. Each access control list is further associated with one or more access predicates that identify one or more rows of a database table to which the associated access control list is applicable. Thus, the access predicates associated with a principal submitting a query are those access predicates associated with an access control list that includes an access entry that either grants or denies the requested privilege to the principal.

In response to determining one or more access predicates associated with the principal, the query is rewritten to form a rewritten query expression, wherein the rewritten query expression comprises a logical expression that includes the one or more associated access predicates outside of the access check operator. Without such a rewrite, the access predicates remain encapsulated in the access check operator and are not exposed to the query optimizer layer during query compilation. Furthermore, during the query rewrite, the access predicates that are inapplicable to the principal submitting the query are removed entirely from the query, resulting in fewer access predicates for the database server to evaluate during execution.

In another embodiment, a database server determines whether any of the access control lists specified by an access check operator includes an access control entry that denies a privilege to a principal. In response to determining that none of the access control lists includes an access control entry that denies a privilege, the query is rewritten to form a rewritten query expression comprising a logical expression that includes a separate access check operator for each of the access control lists, and the associated access predicates are written outside of the access check operators. This rewrite similarly exposes the access predicates to the query optimizer during query compilation for optimization.

In another embodiment, a database server identifies a query that comprises an access check operator that specifies one or more row-specific access control list columns. A row-specific access control list is an access control list that is identified in a column of one or more rows of a database table. The row-specific access control lists take precedence over any other data access control policies associated with the table. In response to identifying a query that comprises an access check operator specifying one or more row-specific access control list columns, the query is rewritten to form a rewritten query expression, the rewritten query expression comprising a logical expression that includes a first access check operator specifying the row-specific access control lists and a second access check operator specifying any remaining data access control policies associated with the table. The access check operator specifying the remaining data access control policies may be further rewritten according to the other techniques described herein. The rewritten query expression ensures that the precedence of the row-specific access control lists is maintained while enabling the database server to take advantage of other rewrite techniques.

Overview of Data Access Control Policies

A data access control policy providing row-level access control to data stored in a database may be specified using one or more access control lists. Each access control list specifies what privileges (e.g., read or update) can be performed by which principals, where each principal is a user or role in the database system. A role is a defined grouping of one or more principals in the database system. In addition to specifying what privileges are granted to particular principles, privileges may also be explicitly denied to one or more principals in an access control list.

In order to specify what privileges are granted or denied to particular principals, each access control list includes one or more access control entries that define a mapping from a principal to a granted or denied privilege. For example, an access control entry may specify that a first user is granted access to read, while another entry may specify that users in a defined "marketing" role are denied the privilege to update data. Thus, each access control entry may specify at least a particular privilege, a value indicating whether the privilege is granted or denied, and a principal.

Access control lists are associated with particular rows of a database table by a condition or predicate that specifies the rows to which each access control list is applicable, referred to herein as access predicates. An access predicate may be specified, for example, as a Structured Query Language (SQL) expression or any other suitable expression for identifying one or more rows of a database table. The combination of an access control list and an access predicate is referred to herein as a data realm. In other words, a data realm comprises (1) an access control list, and (2) an access predicate identifying the one or more database table rows to which the access control list is applicable. Each row of a table may have associated with it one or more data realms. A data access control policy is a collection of one or more data realms that define the access privileges to particular principals to particular rows of one or more database tables.

When a principal submits a query to a database server, a database server enforcing a data access control policy determines whether a table identified by the query is associated with one or more data realms. If the database server determines that the query identifies such a table, during query execution the database server will evaluate the data realms associated with the table for each row requested in the query. If an associated data realm includes an access control list that either grants or denies the requested privilege to the requesting principal and the associated access predicate is true for the current row under evaluation, access to the row is granted or denied to the principal, respectively. If all of the associated data realms are evaluated without an explicit grant or deny result, access to the row may be denied to the principal by default.

If a row under evaluation is associated with more than one data realm, the result of the access control evaluation may depend on the order in which the data realms are evaluated. For example, a first data realm may specify, relative to a table T containing a column col1, an access predicate of col1<2. A second data realm may specify relative to the same table an access predicate of col1<3. Thus, the access predicate of the first data realm and the access predicate of the second data realm would both be satisfied by a row of table T containing the value 1 in the col1 column. However, a first access control list associated with the first data realm and a second access control list associated with the second data realm may have different or even conflicting privilege grants for a particular principal. For example, the first access control list may specify that a particular user is granted the privilege to read. The second access control list may specify exactly the opposite, i.e., that the user is denied the privilege to read. Thus, the privilege that is granted to the user for a row that satisfies the access predicates for both data realms will depend on the order in which the associated access control lists are evaluated.

If a table has more than one data realm associated with it, the data realms are evaluated for each row in an order defined as part of the data security policy. For example, an ordered set of data realms requiring evaluation may be specified as:

a1, C1, a2, C2, . . . , aN, CN, where each of a1-aN represents a particular access control list, and each of C1-CN represents an access predicate that associates the respective access control list with one or more rows of a database table.

When a database server receives a query that requests access to rows of a table associated with a data security policy, the data security policy may be specified as part of the query in an access check query operator. For example, the policy evaluation logic for the data security policy described above, relative to a particular principal p submitting a query, may be specified by the following example access check operator:

CHECK_PRIVILEGE(p, a1, C1, a2, C2, . . . , aN, CN), where CHECK_PRIVILEGE is the access check operator and takes as parameters the principal p and the ordered set of data realms a1, C1, a2, C2, . . . , aN, CN.

Thus, in order for a principal p to have access to requested data in a table associated with the data security policy specified above, the policy evaluation logic specified by the access check operator must return true for all rows requested by the principal. The access control lists associated with the data security policy are evaluated in the specified order for each requested row. If an evaluated access control list either grants or denies the checked privilege and the associated condition holds for the row, access to the row is granted or denied, respectively, to the principal. If the evaluation logic for a particular row reaches the end of the list of data realms without a result, access to the row is denied.

In an embodiment, the access check operator is included as part of the query submitted by the principal during the query compilation process. For example, in response to receiving the query SELECT*FROM T from a principal p, a database server may append an access check operator to the query during query compilation, resulting in the query expression:

SELECT*FROM T WHERE CHECK_PRIVILEGE(p, a1, C1, a2, C2, . . . , aN, CN).

Thus, the CHECK_PRIVILEGE access check operator will be used by the database server to control access by principal p to the requested rows of database table T.

Query Rewrite and Optimization

When a database server receives a query, the database system performs a series of steps of translation, semantic analysis, rewriting, and optimization before executing the query. Each step of the query transformation may result in a re-formed representation of the query. Alternatively, the database system may represent the transformed query as in-memory data structures at one or more steps of the query transformation. The next sections describe query rewrites that are relevant to the techniques described herein.

After receiving a query, a database server performs one or more steps of query parsing and semantic analysis on the query during the query compilation process. In performing semantic analysis upon the query, the database server generates an internal representation of the query. After the internal representation of the query has been generated, part of the semantic analysis will include the database server determining whether one or more of the tables specified in the query expression are associated with a data security policy. In response to determining that the one or more of the tables specified in the query are associated with a data security policy, the database server rewrites the query to include an access check operator, as described above.

The query expression is then further analyzed to determine whether one or more additional query rewrites are applicable, as further described herein. In one embodiment, the additional query rewrites occur during the semantic analysis of the query, or in other words, during the first query rewrite. In other embodiments, the rewrites may occur at other times in the query compilation process, and may occur as part of a single rewrite or as multiple rewrite steps.

User-Specific Rewrite

In one embodiment, a query is rewritten based in part on the particular principal that is requesting the query, referred to herein as a user-specific rewrite. A user-specific rewrite of a query rewrites the access check operator as a logical combination of the access predicates of the data realms that include an access control entry that either grants or denies the requested privilege to the principal submitting the query. A user-specific rewrite removes entirely those data realms that neither grant nor deny the requested privilege to the principal so that those data realms are not unnecessarily evaluated during query execution. The database optimization layer is then able to further optimize the query execution plan based on the remaining access predicates that are exposed outside of the access check operator and in the query statement. In an embodiment, when the database compiles the user-specific rewritten query, the result is saved as a database cursor that is available for reuse by the same principal or another principal with identical privilege grants.

For example, a particular table T may have associated with it data realms a1, C1, a2, C2, . . . , aN, CN. A principal user1 may then submit a query to a database server that identifies the database table T. After receiving the query, a database server will rewrite the query to include an access check operator, as described above. The database server may further rewrite the query based on the submitting principal p and the data realms associated with the table T. For example, the rewrite of the access check operator for the table T described above may be expressed by the database server as REWRITE [CHECK_PRIVILEGE(p, a1, C1, a2, C2, . . . , aN, CN)].

FIG. 1 is a flow diagram that illustrates the process of a database server rewriting a query that includes an access check operator based on a user-specific rewrite. In step 110, a database server identifies a query that comprises an access check operator. A user-specific rewrite of a query generally proceeds by evaluating the list of data realms specified in the access check operator in the specified order to determine the access predicates relevant to the principal submitting the query, and to rewrite the query to comprise a logical expression of only those access predicates.

In step 115, the database server determines whether any data realms remain in the ordered list of data realms specified in the access check operator. If no data realms remain in the ordered list, the rewrite is complete. Otherwise, evaluation proceeds with the next data realm specified in the ordered list. For example, in reference to the example access check operator above, the database server first evaluates the data realm a1, C1.

In step 120, the database server determines whether the access control list of the current data realm grants the requested privilege to the principal. For example, the database server first determines if the access control list a1 of the first data realm grants the requested privilege to the principal. If access control list a1 includes an access control entry that grants the requested privilege to the principal, the principal is granted the requested privilege for all the rows specified by the access predicate C1, in addition to any rows granted by the remaining data realms. Thus, if the access control list of the data realm under evaluation grants the requested privilege, the database server rewrites (step 125) the access check operator as a disjunction of the access predicate of the data realm under evaluation and an access check operator specifying the remaining data realms. Additionally, the rewrite logic is recursively applied to the access check operator specifying the remaining data realms. For example, after determining that the first data realm grants the requested privilege, the database server may rewrite the example access check operator above as the following:

C1 OR REWRITE[CHECK_PRIVILEGE(a2, C2, . . . , aN, CN)]

If the data realm under evaluation does not grant the requested privilege, the database server determines (step 130) whether the access control list of the data realm under evaluation denies the requested privilege. If the access control list denies the requested privilege, logically the principal is granted the requested privilege only for those rows satisfying the conjunction of the logical complement of the associated access predicate and any rows granted by the remaining data realms. Thus, the database server rewrites (step 135) the access check operator to reflect this logic. For example, if the first data realm denies the requested privilege, the database server may rewrite the access check operator as the following:

!C1 AND REWRITE[CHECK_PRIVILEGE(a2, C2, . . . , aN, CN)]

If the data realm under evaluation neither grants nor denies the requested privilege, the associated predicate does not contribute toward identifying any rows for which the principal is either granted or denied the requested privilege. For example, after evaluation of the first data realm, if the access control list a1 includes neither a grant or deny privilege for principal p, then the access predicate C1 is not relevant to the access check. Thus, if the current data realm neither grants nor denies the requested privilege, in step 140, the current data realm is omitted from the rewritten query expression.

The access check operator is rewritten in this manner recursively over the ordered list of data realms specified in the access check operator until no data realms remain specified in an access check operator. At the end of the rewriting process, only those access predicates associated with an access control list that either grants or denies to the requested privilege remain in the query. As a result, the access check operator is no longer included in the query.

The user-specific rewrite provides an optimized rewrite of a query that includes an access check operator by removing from the query the access check operator and the data realms that are not relevant to the requesting principal. Additionally, because the relevant access predicates are exposed in the query rather than encapsulated in the access check operator, the database server may use the access predicates to further optimize the query during subsequent query compilation steps.

Cursor Sharing

Information stored about a query rewritten using a user-specific rewrite, as described above, may be reused by at least the same principal in subsequent query requests. Various database languages, such as SQL, support special-purpose constructs referred to herein as "cursors". During the compilation of a query, the database server may perform a significant amount of preliminary work for the query, such as parsing, semantic analysis, query rewriting, and query plan generation. A cursor stores the results of much of this preliminary work. For example, one set of information stored in a cursor includes the execution plan for performing the operations specified by the SQL statement during query execution.

In one embodiment, when a database server receives a query submitted by a particular principal, the database server performs a cursor sharing check in order to determine whether the principal submitting the query may use an existing cursor. For example, a principal that subsequently submits a query that has been previously rewritten using the user-specific rewrite technique may reuse a cursor saved for the rewritten query, assuming that the principal's access privileges have not changed. Reuse of a saved cursor allows the database server to execute the query without re-performing all of the compilation steps already processed for the query. In addition to reusing a cursor for the same principal subsequently submitting a query, in another embodiment, a principal with the same privileges as another principal that has a saved cursor may reuse the same cursor.

In order to reuse previously saved database cursors, a database server receiving a query that identifies a database table associated with a data access control policy first determines the privileges associated with the requesting principal based on the data access control policy. After determining the privileges associated with the requesting principal, the requesting principal's privileges are compared to existing cursors in order to determine whether the principal may reuse a saved cursor. If a saved cursor exists for the requesting principal or a principal with the same privileges as the requesting principal, the database server may use the saved cursor to execute the query instead of recompiling the query.

However, because two principals with different privileges cannot reuse the same cursor saved for a user-specific rewrite, a query must be rewritten for each principal with different access privileges. This may result in the number of saved cursors becoming quite large. In an embodiment, a restriction may be placed on the number of cursors that may be saved by the database server in order to prevent too many cursors from being saved and over consuming database resources. For example, a value may be stored indicating a limit on the maximum number of stored database cursors.

Grant-Only Rewrite

In another embodiment, a query may be rewritten for an access control policy specified by an access check operator that does not include a denied privilege, referred to herein as a grant-only rewrite. A grant-only rewrite is applicable to a query comprising an access check operator, where each of the data realms specified in the access check operator includes only granted privileges. As described above, the order in which the data realms specified by an access check operator are evaluated is generally relevant because one or more of the data realms may contain an access control list that denies a privilege to a principal. However, if none of the data realms deny a privilege to a principal, the need to enforce the ordering semantics of the data realms no longer exists, enabling simplification of the query.

In an embodiment, a database server determines that each of the data realms specified in an access check operator does not contain an access control list that includes a denied privilege. In response to determining that none of the access control lists include a denied privilege, the database server rewrites the query so that the access check operator is written as, for each specified data realm, a logical disjunction of the conjunction of (1) an access check operator specifying the principal and the access control list of the data realm, and (2) the respective access predicate written outside of the access check operator.

For example, assume that a database server receives a query with an access check operator that specifies data realms a1, C1, a2, C2, . . . , aN, CN, and that none of access control lists a1-aN contains a denied privilege. If the access check operator in the query is expressed as CHECK_PRIVILEGE (p, a1, C1, a2, C2, . . . , aN, CN), a grant-only rewrite of the query would rewrite the portion of the query containing the access check operator as follows:

CHECK_PRIVILEGE(p, a1) AND C1 OR CHECK_PRIVILEGE(p, a2) AND C2 . . . OR CHECK_PRIVILEGE(p, aN) AND CN.

As illustrated above, a grant-only rewrite exposes the access predicates associated with each data realm outside of the access check operator, allowing for subsequent optimizations by the query optimizer processes. Furthermore, because the grant-only rewrite retains the check access operator specifying the requesting principal, the grant-only rewrite is generic in the sense that a cursor saved for the rewrite is reusable by any other requesting principal. Thus, no check is required in order for a subsequent requesting principal to reuse a cursor saved for a query rewritten by a grant-only rewrite.

There are at least two possible instances when a grant-only rewrite may be applicable. In the embodiment described above, a query may be rewritten using a grant-only rewrite when none of the data realms specified in the query includes an access control list that denies a privilege to any principal. In other words, the set of data realms specified in the query would not deny any privilege regardless of which principal submits the query. In this case, no cursor check is required in order for a saved cursor to be shared by other principals.

In another embodiment, a grant-only rewrite may be used when the particular principal submitting the query is not denied the requested privilege in any of the specified data realms, but either other principals are denied a privilege, or the requesting principal is denied some other privilege not requested in the current query. In this case, the query may be rewritten using the grant-only logic described above, but a resulting saved cursor may not be generally reusable by all principals. The cursor generated for a rewritten query that includes denied privileges other than those requested by the current principal may be reused only by the same principal or another principal with the same privileges. Thus, a cursor saved for such a rewrite requires a similar cursor sharing check as described in connection with a user-specific rewrite.

Rewrite for Row-Specific Access Control Lists

In another embodiment, a rewrite technique is applicable when one or more access control lists are stored in one or more rows of a table identified in a query. For example, a table storing other data may include one or more columns in which access control lists may be stored or specified per each row of the table. Each row-specific access control list is applicable only to the row in which it is stored. The row-specific access control lists define an access control policy in addition to any external access control policy based on data realms. A database table may include any number of columns for storing row-specific access control list, and an access check operator may be modified in order to support row-specific access control lists in addition to external access control policies. For example, an access check operator may be extended for a table that includes two columns storing row-specific access control lists as follows:

CHECK_PRIVILEGE(p, aa, sa, a1, C1, a2, C2, ..., aN, CN)

The access check operator above includes two additional paramters, aa and sa, representing two columns of a table storing row-specific access control lists. In an embodiment, the row-specific access control lists take precedence over any other data access control policy associated with the same table (i.e., the data realms specified after the aa and sa parameters). If evaluation of the row-specific access control lists results in the privilege being granted or denied to the principal, access to the requested rows is granted or denied, respectively, and the remaining data realms do not need to be evaluated. If the requested privilege is neither granted nor denied to the requesting principal based on the row-specific access control lists, then the remaining data realms associated with the tables are evaluated.

Thus, a principal's access to requested rows of a table that comprises row-specific access control lists is based on evaluation of any row-specific access control lists in the order specified by the access control operator, or the evaluation of any remaining data access policy if the row-specific access control lists do not produce a grant or deny result. A row-specific access control list rewrite logically rewrites a query comprising an access check operator specifying one or more row-specific access control lists to reflect this logic. For example, if a database server determines that a query comprises an access check operator that specifies two row-specific access control list columns aa and sa, the check access operator may be rewritten as follows:

CHECK_PRIVILEGE(p, aa, sa)=Grant OR CHECK_PRIVILEGE(p, aa, sa)=Neither AND REWRITE [CHECK_PRIVILEGE(p, a1, C1, a2, C2, ..., aN, CN)]

Logical evaluation of the rewritten access check operator illustrated above properly accounts for the precedence of the row-specific access control lists. For example, if evaluation of the access check operator for the row-specific access control lists results in a grant, then the entire rewritten portion of the query will return true and access to the row will be granted to the principal. If evaluation of the access check operator for the column access control list results in a deny, the entire rewritten query portion will return false and the principal will be denied access to the row. If evaluation of the row-specific access control lists results in neither an access grant or a deny, then access to the row will be determined based on an access check of any remaining data realms.

Furthermore, as illustrated above, the access check operator specifying any remaining data realms may itself be rewritten using the other rewrite techniques herein. In the rewritten expression above, the access check of the row-specific access control lists is separated from the access check of the remaining data realms allowing the access check of the remaining data realms to be further rewritten based on other optimization techniques. For example, a database server may first rewrite a query comprising an access check operator that specifies one or more row-specific access control list columns using a row-specific access control list rewrite, and then further rewrite the query using a user-specific query rewrite or a grant-only rewrite, depending on the characteristics of the other data realms and the requesting principal.

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. A process is an allocation of memory, CPU time for executing software, and possibly other computer resources, the allocation being made by the operating system on the computer system on which the process is running. In the case of process for a database server, the process executes database server software.

Resources from multiple nodes in a multi-node database system can be allocated to running a particular database server's software. Each combination of the software and allocation of the resources from a node is a server that is referred to herein as a "server instance" or "instance".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
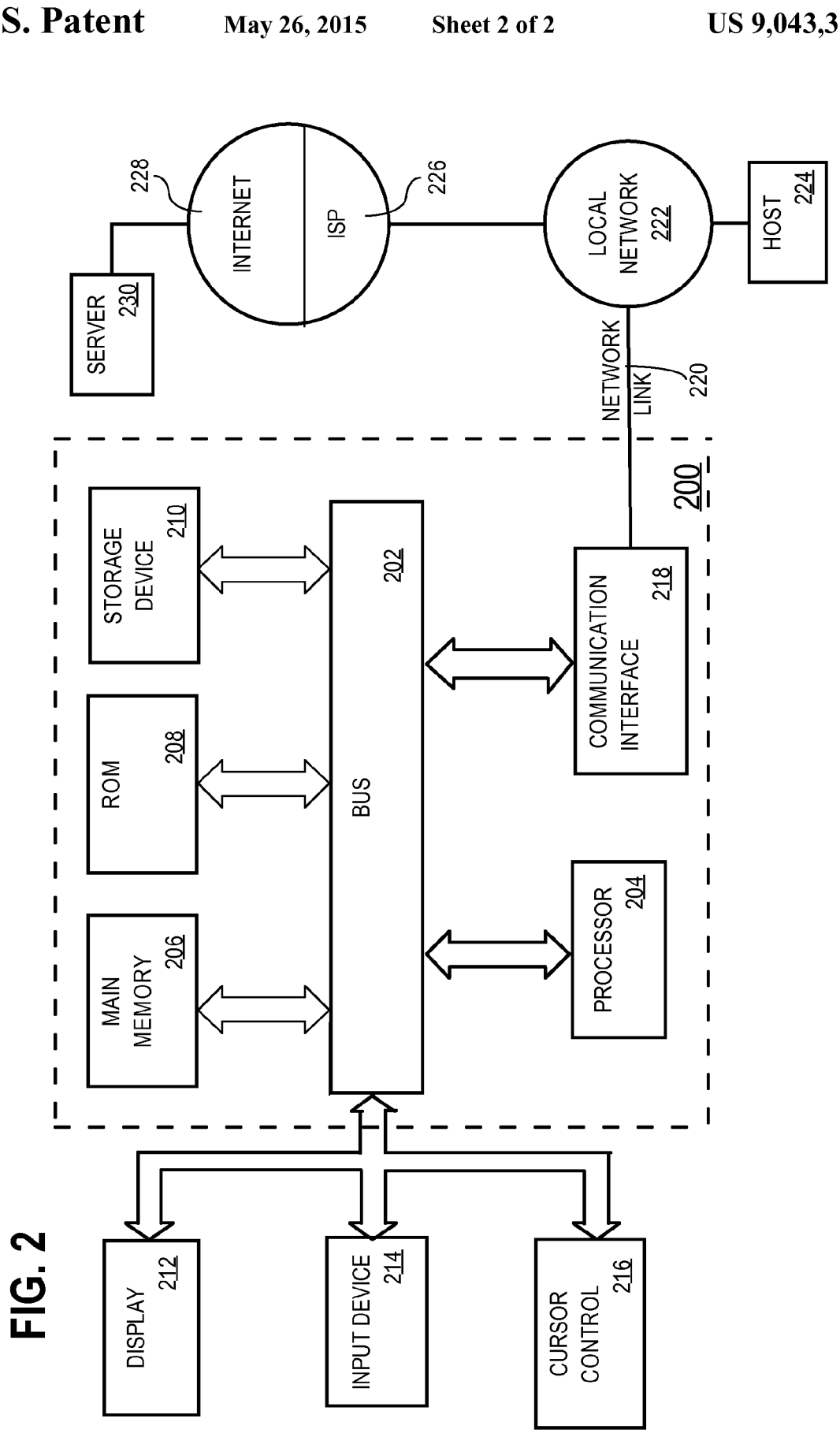
FIG. 2 is a block diagram that illustrates a computer system upon which an embodiment may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising steps of:
   receiving a query expression associated with a first principal and against data stored in one or more tables of a database, wherein at least one of the one or more tables is associated with one or more data realms of a data access control policy;
   wherein each data realm of the one or more data realms comprises an access predicate and at least one list of entries, wherein the access predicate specifies one or more rows to which the at least one list of entries is applicable, and wherein each entry of said at least one list of entries maps one or more principles to one or more privileges granted or denied to said one or more principles;
   rewriting the query expression to form a first rewritten query expression, wherein the first rewritten query expression includes an access check query operator that specifies the one or more data realms as parameters;
   determining, based on the first principal and the one or more data realms, that one or more particular access predicates of the one or more data realms are associated with the first principal; and
   in response to determining that the one or more particular access predicates are associated with the first principal, rewriting the first rewritten query expression to form a second rewritten query expression, wherein the second rewritten query expression comprises the one or more particular access predicates associated with the first principal outside of the access check query operator; and
   wherein the method is performed by one or more computing devices.

2. The computer-implemented method of claim 1, wherein the access check query operator specifies the one or more data realms as an ordered list of parameters.

3. The computer-implemented method of claim 1, wherein the determining that one or more particular access predicates of the one or more data realms are associated with the first principal further comprises:
   identifying a requested privilege associated with the query expression;
   determining that one or more access control lists include an access control entry specifying that the requested privilege is either granted or denied to the first principal.

4. The computer-implemented method of claim 1, wherein the second rewritten query expression comprising the one or more access predicates associated with the first principal includes a logical expression of the one or more access predicates associated with the first principal.

5. The computer-implemented method of claim 1, further comprising storing a database cursor based on the second rewritten query expression.

6. The computer-implemented method of claim 5, further comprising:
   receiving a second query expression associated with the first principal;
   executing the second query expression based on the database cursor.

7. The computer-implemented method of claim 5, further comprising:
   receiving a second query expression associated with a second principal;
   determining, based on the one or more data realms, whether the second principal has the same privileges as the first principal;
   in response to determining the second principal has the same privileges as the first principal, executing the second query expression based on the database cursor.

8. The computer-implemented method of claim 5, further comprising storing a value indicating a limit on the maximum number of stored database cursors.

9. A computer-implemented method comprising steps of:
   receiving a query expression against data stored in one or more tables of a database, wherein at least one of the one or more tables is associated with one or more data realms of an access control policy;
   wherein each data realm of the one or more data realms comprises an access control list and an access predicate, wherein the access predicate specifies one or more rows to which the access control list is applicable, and wherein the access control list comprises one or more access control entries, each access control entry of said one or more access control entries specifying a privilege, a value indicating the privilege is granted or denied, and a principal;

rewriting the query expression to form a first rewritten query expression, wherein the first rewritten query expression includes an access check query operator that specifies the one or more data realms as parameters;

determining that zero of the access control lists of the one or more data realms comprises an access control entry indicating a privilege is denied;

in response to determining that zero of the access control lists of the one or more data realms comprises an access control entry indicating a privilege is denied, rewriting the first rewritten query expression to form a second rewritten query expression, wherein the second rewritten query expression comprises a logical expression including, for each data realm of the one or more data realms, (1) an access check query operator specifying the data realm, and (2) the access predicate outside of the access check query operator;

wherein the method is performed by one or more computing devices.

10. A computer-implemented method comprising steps of:

receiving a query expression against data stored in rows of one or more tables of a database, wherein at least one of the one or more tables is associated with one or more data realms of an access control policy;

wherein each data realm of the one or more data realms comprises an access predicate and at least one list of entries, wherein the access predicate specifies one or more rows to which the at least one list of entries is applicable, and wherein each entry of said at least one list of entries maps one or more principles to one or more privileges granted or denied to said one or more principles;

rewriting the query expression to form a first rewritten query expression, wherein the first rewritten query expression includes an access check query operator that specifies the one or more data realms as parameters;

determining that a row of said one or more tables comprises a column identifying a row-specific access control list;

based on determining that a row of said one or more tables comprises a column identifying a row-specific access control list, rewriting the first rewritten query expression to form a second rewritten query expression comprising a logical expression including (1) a first access check query operator specifying the row-specific access control list, and (2) a second access check query operator specifying the one or more data realms; and wherein the method is performed by one or more computing devices.

11. A non-transitory computer-readable medium storing instructions which, when executed by one or more processors, cause:

receiving a query expression associated with a first principal and against data stored in one or more tables of a database, wherein at least one of the one or more tables is associated with one or more data realms of a data access control policy;

wherein each data realm of the one or more data realms comprises an access predicate and at least one list of entries, wherein the access predicate specifies one or more rows to which the at least one list of entries is applicable, and wherein each entry of said at least one list of entries maps one or more principles to one or more privileges granted or denied to said one or more principles;

rewriting the query expression to form a first rewritten query expression, wherein the first rewritten query expression includes an access check query operator that specifies the one or more data realms as parameters;

determining, based on the first principal and the one or more data realms, that one or more particular access predicates of the one or more data realms are associated with the first principal; and in response to determining that the one or more particular access predicates are associated with the first principal, rewriting the first rewritten query expression to form a second rewritten query expression, wherein the second rewritten query expression comprises the one or more particular access predicates associated with the first principal outside of the access check query operator.

12. The non-transitory computer-readable medium of claim 11, wherein the access check query operator specifies the one or more data realms as an ordered list of parameters.

13. The non-transitory computer-readable medium of claim 11, wherein the determining that one or more particular access predicates of the one or more data realms are associated with the first principal further comprises:

identifying a requested privilege associated with the query expression;

determining that one or more access control lists include an access control entry specifying that the requested privilege is either granted or denied to the first principal.

14. The non-transitory computer-readable medium of claim 11, wherein second the rewritten query expression comprising the one or more access predicates associated with the first principal includes a logical expression of the one or more access predicates associated with the first principal.

15. The non-transitory computer-readable medium of claim 11, the instructions further comprising instructions for storing a database cursor based on the second rewritten query expression.

16. The non-transitory computer-readable medium of claim 15, the instructions further comprising instructions for:

receiving a second query expression associated with the first principal;

executing the second query expression based on the database cursor.

17. The non-transitory computer-readable medium of claim 15, the instructions further comprising instructions for:

receiving a second query expression associated with a second principal;

determining, based on the one or more data realms, whether the second principal has the same privileges as the first principal;

in response to determining the second principal has the same privileges as the first principal, executing the second query expression based on the database cursor.

18. The non-transitory computer-readable medium of claim 15, the instructions further comprising instructions for storing a value indicating a limit on the maximum number of stored database cursors.

19. A non-transitory computer-readable medium storing instructions which, when executed by one or more processors, cause:

receiving a query expression against data stored in one or more tables of a database, wherein at least one of the one or more tables is associated with one or more data realms of an access control policy;

wherein each data realm of the one or more data realms comprises an access control list and an access predicate, wherein the access predicate specifies one or more rows to which the access control list is applicable, and wherein the access control list comprises one or more access control entries, each access control entry of said one or more access control entries specifying a privilege, a value indicating the privilege is granted or denied, and a principal;

rewriting the query expression to form a first rewritten query expression, wherein the first rewritten query expression includes an access check query operator that specifies the one or more data realms as parameters;

determining that zero of the access control lists of the one or more data realms comprises an access control entry indicating a privilege is denied; and in response to determining that zero of the access control lists of the one or more data realms comprises an access control entry indicating a privilege is denied, rewriting the first rewritten query expression to form a second rewritten query expression, wherein the second rewritten query expression comprises a logical expression including, for each data realm of the one or more data realms, (1) an access check query operator specifying the data realm, and (2) the access predicate outside of the access check query operator.

20. A non-transitory computer-readable medium storing instructions which, when executed by one or more processors, cause:

receiving a query expression against data stored in rows of one or more tables of a database, wherein at least one of the one or more tables is associated with one or more data realms of an access control policy;

wherein each data realm of the one or more data realms comprises an access predicate and at least one list of entries, wherein the access predicate specifies one or more rows to which the at least one list of entries is applicable, and wherein each entry of said at least one list of entries maps one or more principles to one or more privileges granted or denied to said one or more principles;

rewriting the query expression to form a first rewritten query expression, wherein the first rewritten query expression includes an access check query operator that specifies the one or more data realms as parameters;

determining that a row of said one or more tables comprises a column identifying a row-specific access control list; and based on determining that a row of said one or more tables comprises a column identifying a row-specific access control list, rewriting the first rewritten query expression to form a second rewritten query expression comprising a logical expression including (1) a first access check query operator specifying the row-specific access control list, and (2) a second access check query operator specifying the one or more data realms.

* * * * *

UNITED STATES PATENT AND TRADEMARK OFFICE
CERTIFICATE OF CORRECTION

PATENT NO. : 9,043,309 B2
APPLICATION NO. : 13/488739
DATED : May 26, 2015
INVENTOR(S) : Ahmed et al.

It is certified that error appears in the above-identified patent and that said Letters Patent is hereby corrected as shown below:

In the specification,
In column 9, line 42, delete "paramters," and insert -- parameters, --, therefor.

Signed and Sealed this
Ninth Day of February, 2016

Michelle K. Lee
*Director of the United States Patent and Trademark Office*